(12) United States Patent
Achterholt

(10) Patent No.: US 11,090,985 B2
(45) Date of Patent: Aug. 17, 2021

(54) METHOD AND DEVICE FOR DETECTING ABSOLUTE FRICTION WEAR ON AT LEAST ONE TIRE OF A VEHICLE

(71) Applicants: Joerg Pieper, Uhldingen-Mühlhofen (DE); Herbert Nowicki, Constance (DE)

(72) Inventor: Rainer Achterholt, Kreuzlingen (CH)

(73) Assignees: Joerg Pieper, Uhldingen-Muehlhofen (DE); Herbert Nowicki, Constance (DE)

( * ) Notice: Subject to any disclaimer, the term of this patent is extended or adjusted under 35 U.S.C. 154(b) by 0 days.

(21) Appl. No.: 16/466,807

(22) PCT Filed: Dec. 6, 2017

(86) PCT No.: PCT/IB2017/057679
§ 371 (c)(1),
(2) Date: Jun. 14, 2019

(87) PCT Pub. No.: WO2018/104876
PCT Pub. Date: Jun. 14, 2018

(65) Prior Publication Data
US 2019/0344625 A1    Nov. 14, 2019

(30) Foreign Application Priority Data
Dec. 6, 2016    (DE) .................... 10 2016 014 449.1

(51) Int. Cl.
*B60C 11/24*    (2006.01)
*B60C 23/04*    (2006.01)
(Continued)

(52) U.S. Cl.
CPC .......... *B60C 11/246* (2013.01); *B60C 11/243* (2013.01); *B60C 23/04* (2013.01);
(Continued)

(58) Field of Classification Search
None
See application file for complete search history.

(56) References Cited

U.S. PATENT DOCUMENTS 5,913,240 A * 6/1999 Drahne ................ B60T 8/1725
                                                    73/146
7,603,894 B2 * 10/2009 Breed ............... B60R 21/01538
                                                    73/146
(Continued)

FOREIGN PATENT DOCUMENTS

DE    10 2005 052476 A1    5/2007
DE    10 2014 112 306 A1    3/2016
(Continued)

OTHER PUBLICATIONS

International Search Report in PCT/162017/057679, dated Mar. 2, 2018.

*Primary Examiner* — Peter J Macchiarolo
*Assistant Examiner* — Jermaine L Jenkins
(74) *Attorney, Agent, or Firm* — Collard & Roe, P.C.

(57) ABSTRACT

The invention relates to a method and an apparatus for determination of the wear on at least one tire of a vehicle, wherein the vehicle has a tire pressure monitoring system, consisting of a pressure sensor, a transmission unit and a reception unit, as well as a computer unit and a data memory having a database. Proceeding from a circumference of the tire (5) defined by the tire manufacturer and thereby a mantle surface having a length L=2πr, wherein r is the radius of the tire (5), the radius decreases during corresponding wear, and thereby the length of the mantle surface also decreases. The length of the flat pattern of a new tire is therefore greater, in terms of length, than the length of the flat pattern of a used tire. This is determined by a sensor (4), the value of which is transmitted by a first module (2) to a second module (3), (Continued)

Figure 1:
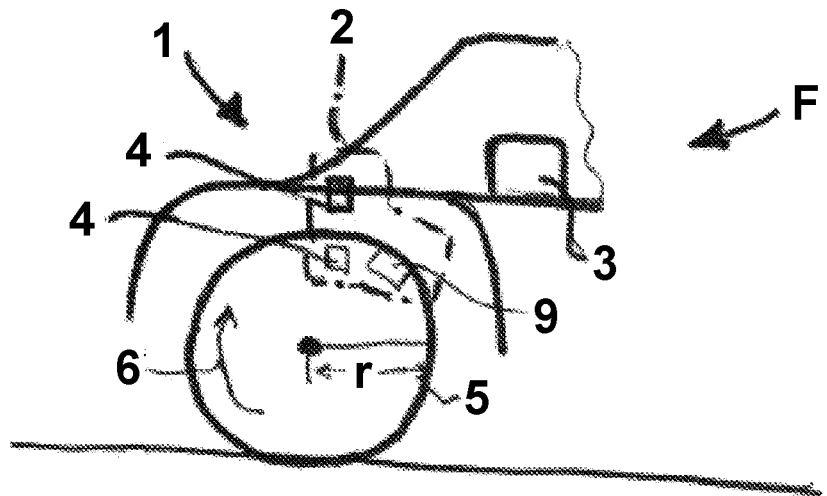

which is fixed in place. There, the value L is calculated and compared with data in a database and evaluated.

4 Claims, 1 Drawing Sheet

(51) Int. Cl.
*G01B 5/00* (2006.01)
*G01B 5/02* (2006.01)
*G01B 5/30* (2006.01)

(52) U.S. Cl.
CPC ........... *G01B 5/0025* (2013.01); *G01B 5/025* (2013.01); *G01B 5/30* (2013.01)

(56) References Cited

U.S. PATENT DOCUMENTS

| | | | | |
|---|---|---|---|---|
| 8,191,591 | B2* | 6/2012 | Shimizu | B60C 11/01 |
| | | | | 152/209.18 |
| 9,050,864 | B2* | 6/2015 | Singh | B60C 23/064 |
| 10,144,252 | B2* | 12/2018 | Kaji | B60C 11/1323 |
| 10,352,827 | B2* | 7/2019 | Kato | G01M 17/02 |
| 10,525,777 | B2* | 1/2020 | Goto | B60W 40/068 |

FOREIGN PATENT DOCUMENTS

| | | | |
|---|---|---|---|
| EP | 2 172 759 | A1 | 4/2010 |
| EP | 3 020 578 | A1 | 5/2016 |

\* cited by examiner

METHOD AND DEVICE FOR DETECTING ABSOLUTE FRICTION WEAR ON AT LEAST ONE TIRE OF A VEHICLE

CROSS REFERENCE TO RELATED APPLICATIONS

This application is the National Stage of PCT/IB2017/057679 filed on Dec. 6, 2017, which claims priority under 35 U.S.C. § 119 of German Application No. 10 2016 014 449.1 filed on Dec. 6, 2016, the disclosure of which is incorporated by reference. The international application under PCT article 21(2) was not published in English.

TECHNICAL FIELD

The invention relates to a method and an apparatus for determination of the wear on at least one tire of a vehicle, wherein the vehicle has a tire pressure monitoring system consisting of a pressure sensor, a transmission and reception unit, as well as a computer unit and a data memory having a database.

STATE OF THE ART

The tires of a vehicle wear during operation of a vehicle. Over time, the profile of the tires can wear down to a point at which replacement of the tires becomes necessary. Appropriate monitoring is necessary.

Thus, for example, a tire profile depth measurement device is known from DE 10 2014 112 306 A1, which device permanently determines the profile depth of the tire and transmits it to a central unit within the vehicle. For this purpose, it is necessary that a sensor element is introduced into the running surface, which comprises the profile of the tire, which element transmits a signal, which is proportional to the profile depth actually present, by means of the corresponding radial placement of the element and by means of the shortening in length caused by the wear. Thus, it is possible to draw a conclusion regarding an actual profile depth of the tire.

Operating costs, useful lifetimes, and safety in traffic are essential characteristics that are of great importance for the operators of vehicle fleets. In order to obtain actual values here, systems are known with which important data of vehicles can be recorded and archived. Data regarding tires, their pressure and temperature can also be measured accordingly, and thereby determined and archived.

DISADVANTAGES OF THE STATE OF THE ART

Profile depth measurement requires great effort, since the sensor for the profile depth measurement must be placed precisely radially, and must then be calibrated.

Furthermore, only one location on the tire is measured, so that non-uniform wear cannot be taken into consideration visually.

The systems for tire profile depth measurement are very complex, and generally an absolute measurement of the profile depth is not actually required, but rather, instead, what is required is an estimate of the actual running performance, and this can be achieved using simple means.

TASK OF THE INVENTION

The task of the invention consists in making available a method and an apparatus that allow simple determination of the wear of a tire.

SOLUTION OF THE TASK

The solution of the task is made available by means of the characteristics of claim 1 or claim 5.

ADVANTAGES OF THE INVENTION

The basic idea of the invention consists in measuring the length of the mantle surface of the tire that is being used on the vehicle. This is because this length is a measure of the wear and thereby also of the use of the tire. Proceeding from a tire circumference defined by the tire manufacturer and thereby from a mantle surface having a length $L=2\pi r$, wherein r is the radius of the tire, the radius decreases in the case of corresponding use, and thereby the length of the mantle surface decreases. The length of the flat pattern of a new tire is therefore greater, in terms of length, than the length of the flat pattern of a used tire.

Using this basic idea, it is possible to determine the revolution of the wheel using a sensor disposed on or in the tire. If one proceeds from the example that the length of the mantle surface of the tire amounts to 3 meters, and the tire rotates at 5 km/h, then one revolution requires the time of x seconds. A tire that is worn has a lesser length of the mantle surface, for example 2.95 meters. This corresponds to a reduction in the profile height of 2.5 mm. If the tire now rotates at the speed of 5 km/h, then a revolution takes the time of y seconds. Based on the wear, x>y, i.e. the time is shorter in the case of a worn tire.

In order to implement this basic idea technically, a sensor is provided in a first embodiment of the invention, which sensor corresponds with a locally fixed sensor on the car body, so that a complete revolution of the wheel can be determined, in each instance. In this regard, the sensor generates a data element, which is passed on to a system present in the wheel. The system is a tire pressure monitoring system (abbreviated as RDKS, RDK or RDC) or tire pressure monitoring systems (TPMS) and serves for monitoring the tire pressure and the temperature of the tires of vehicles. In the case of such directly measuring systems, a pressure sensor detects the internal pressure and the air temperature of a tire. These data are wirelessly transmitted to a control device in the vehicle, together with an identifier (which serves to identify the tire that was measured) at certain intervals or measurement sequences. These systems can detect gradual or also sudden pressure losses on all tires, since they monitor the pressure directly. Depending on the display concept, the driver receives a message regarding the current pressure value in clear text, which is either displayed constantly on the display or which the driver can request by pushing a button, or the driver only receives a warning if the tire pressure is too low. This transmission via the system is also utilized by the data element described above. In connection with the speed determined at the time point of measurement, the length L of the mantle surface of the respective tire can then be calculated and stored in memory. In the subsequent measurement segment (interval), the measurement process is repeated. If the time y is shorter than the time y that was determined before the measurement segment, then the tire has become worn further. This time is stored in memory so as to compare it with the further measurement segments.

In order to obtain comparable measurement values, the measurement segments are carried out under at least comparable conditions. Here, too, the respective data are stored in memory, so as to undertake a comparison. These same conditions are present if speed, tire temperature, and tire pressure are comparable with the previous measurement segment. Advantageous sensors act bi-directionally. This means that measurements can also be triggered at request by the system or manually.

Alternatively, a gyroscope sensor can be used for implementation. A gyroscope sensor is an acceleration sensor or position sensor that reacts to the slightest accelerations, rotational movements or changes in position. The principle of the gyroscope sensor is based on mass inertia and is used in centrifugal force regulators, among other things. The rotational movements detected by a gyroscope sensor are indicated as a voltage change with reference to the rotational speed: millivolts per degree of rotational movement per second (V/degrees/s). In this regard, the gyroscope sensor detects a revolution and transmits this data segment to the existing system, in which—as described above—the length of the mantle surface is then calculated.

Such a sensor is a small component, which can be placed on the inside of the tire, for example in the valve region or also on the rim. It is not subject to wear.

On a measurement distance of 5000 m, the following values are obtained, according to the method:

A tire having a length L=3.00 m of mantle surface rolls on a planar surface at a speed of 5 km/h. During this process, it performs 1666 revolutions/hour. If one compares a tire having a mantle surface of L=2.95 m, wherein the tire rolls on a planar surface at a speed of 5 km/h, then this tire performs 1694 revolutions/hour. A tire having a length L=2.90 m of mantle surface rolls on a planar surface at a speed of 5 km/h. During this process, it performs 1724 revolutions/hour. A length reduction from L=3.00 m to L=2.95 m leads to a profile height reduction by 2.5 mm. A length reduction from L=3.00 m to L=2.90 m leads to a profile height reduction by 5.0 mm.

The wear of the tire can be determined in very simple manner by means of a sensor having a simple structure and by means of coupling with a TPMS system that is present on the vehicle.

Further advantageous embodiments are evident from the following description and the claims.

DRAWINGS

Figure 2:
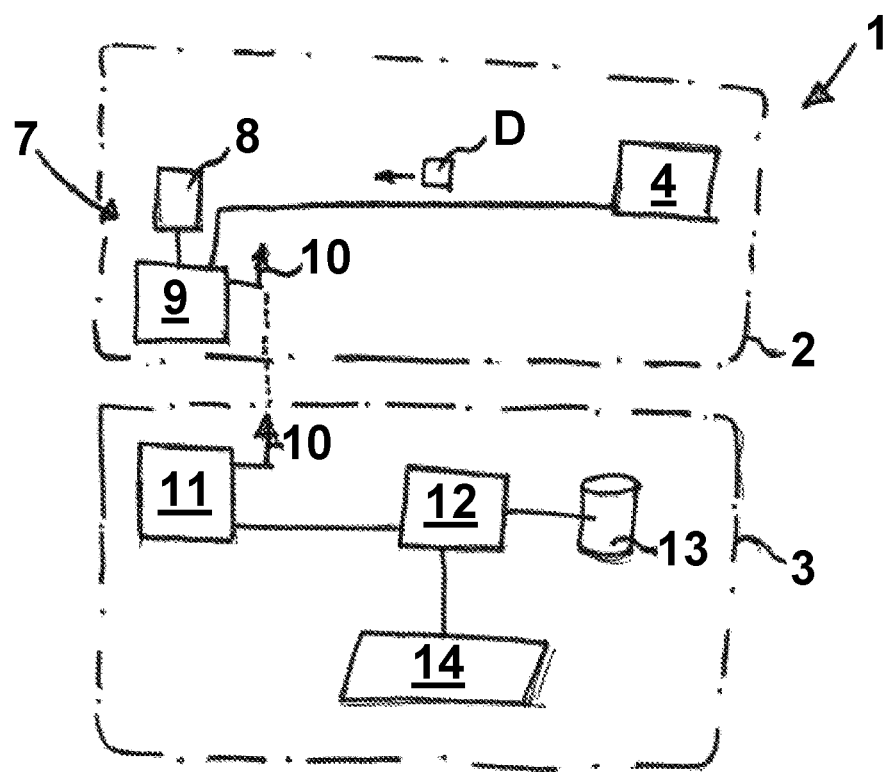

These show:

FIG. 1 a fundamental diagram of the arrangement of the apparatus for determination of the tire wear;

FIG. 2 a schematic for representation of the method for determination of the tire wear of a vehicle.

DESCRIPTION OF AN EXEMPLARY EMBODIMENT

In FIGS. 1 and 2, the principle of the method for determination of tire wear of a vehicle F having at least one tire 5 is shown. The tire 5 rotates either in the direction of rotation 6 or counter to it. The apparatus 1 for carrying out the method comprises a first module 2 as well as a second module 3. The first module 2 is provided for recording the data, wherein the second module 3 is provided for evaluation and representation of the results of the data.

The first module 2 comprises the sensor 4 for determination of the revolutions of a tire 5. This sensor 4 is either configured as a gyroscope sensor or it acts—as shown in FIG. 1—together with a further sensor, which is fixed in place on the body of the vehicle F. Furthermore, a tire pressure monitoring system 7 for determination of the pressure within the tire 5 is provided, consisting of a pressure sensor 8 and a transmission unit 9 for generation of a radio signal 10.

The second module 3 is coupled with the first module 2 by way of the wireless segment or the radio signal 10 that proceeds from the transmission unit 9. This module 3 has a reception unit 11. A computer unit 12, which in turn interacts with a data memory 13, is coupled with the reception unit 11. The result of the computer unit 12 is shown on a display unit 14, preferably in the region of the vehicle driver.

The sensor 4 for determination of the revolution of the tire 5 of the vehicle F transmits a data segment D, consisting of the number of revolutions and the time, after a revolution. The data segment D is transmitted to the reception unit 11, by way of the wireless segment 10, by the transmission unit 9, and is calculated there in the coupled computer unit 12. Proceeding from a tire circumference defined by the tire manufacturer, and thereby a mantle surface having a length $L=2\pi r$, wherein r is the radius of the tire 5, the radius r decreases during corresponding use. For this reason, first the length L of the mantle surface of the new tire 5 is stored in the data memory 13. Calculation of the data segment D, which is made available in measurement segments, now takes place in the computer unit 12, to obtain a new value L, which corresponds to the actual length of the mantle surface of the tire 5. This new value L is compared with the value L stored in the database.

If the time for a revolution per tire is now shorter, and thereby the length of the mantle surface L is shorter than what was already stored in memory, then the new value is stored in memory, in such a manner that it is available for a new comparison.

If the actual length L of the mantle surface of the tire 5 has dropped below a previously defined value, which is also stored in the data memory 13, then it is displayed in the region of the vehicle driver that the profile depth at least required for the defined tire 5 is no longer met. This has the consequence that this tire should be replaced.

By means of the method, the profile depth can be measured as a function of the actual running output, by means of little technical effort, and a warning message can be issued if the value is no longer met.

REFERENCE SYMBOL LIST

Method and apparatus for determination of the wear on at least one tire of a vehicle
1 apparatus
2 first module
3 second module
4 sensor
5 tire
6 direction of rotation
7 tire pressure monitoring system
8 pressure sensor
9 transmission unit
10 radio signal
11 reception unit
12 computer unit 13 data memory
14 display unit
D data segment
F vehicle
L length

The invention claimed is:

1. A method for determination of the absolute friction wear on at least one tire of a vehicle, wherein the vehicle has a tire pressure monitoring system, comprising a pressure sensor, a transmission unit and a reception unit, as well as a computer unit and a data memory having a database, the method comprising the following method steps:
   a. determining by a sensor and providing as a data segment a complete revolution of the tire as well as a time required for the complete revolution of the tire;
   b. transmitting the data segment by way of the transmission unit and the reception unit to the computer unit;
   c. calculating a calculated value of an actual length L of a mantle surface of the tire with a radius r and storing in memory the calculated value as a stored length;
   d. comparing the actual length L with the stored length of the data segment in the data memory;
   e. comparing the calculated value of the actual length L stored in the data memory, as to whether the actual length L is shorter, the same, or longer;
      i. if the actual length L is longer, then repeating the determination according to step a;
      ii. if the actual length L is the same, then repeating the determination according to step a;
      iii. if the actual length L is shorter, then storing the calculated value of the actual length in the data memory and comparing the calculated value with a minimum value that is also stored in the data memory;
         I. if the actual length L is the same as or greater than the minimum value, then repeating the determination according to step a;
         II. if the actual length L is smaller than the minimum value, then issuing a warning message that a tire profile minimum dimension is no longer met.

2. The method according to claim 1, wherein the sensor for determination of the revolution is a gyroscope sensor.

3. The method according to claim 1, wherein the pressure sensor of the tire pressure monitoring system and the sensor for determination of the revolution of the tire are separate components.

4. The method according to claim 1, wherein the time required for the complete revolution of the tire is calculated based on a distance traveled and a related speed.

* * * * *